W. H. TIBBALS.
FIRE ESCAPE.
APPLICATION FILED NOV. 14, 1913.
1,190,483.
Patented July 11, 1916.
2 SHEETS—SHEET 2.
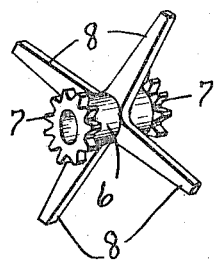
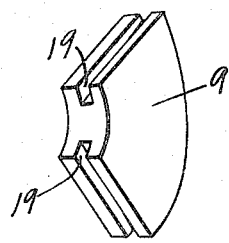
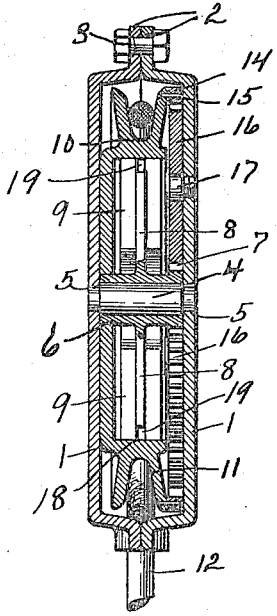
WITNESSES:
INVENTOR
W. H. Tibbals
BY
ATTORNEY

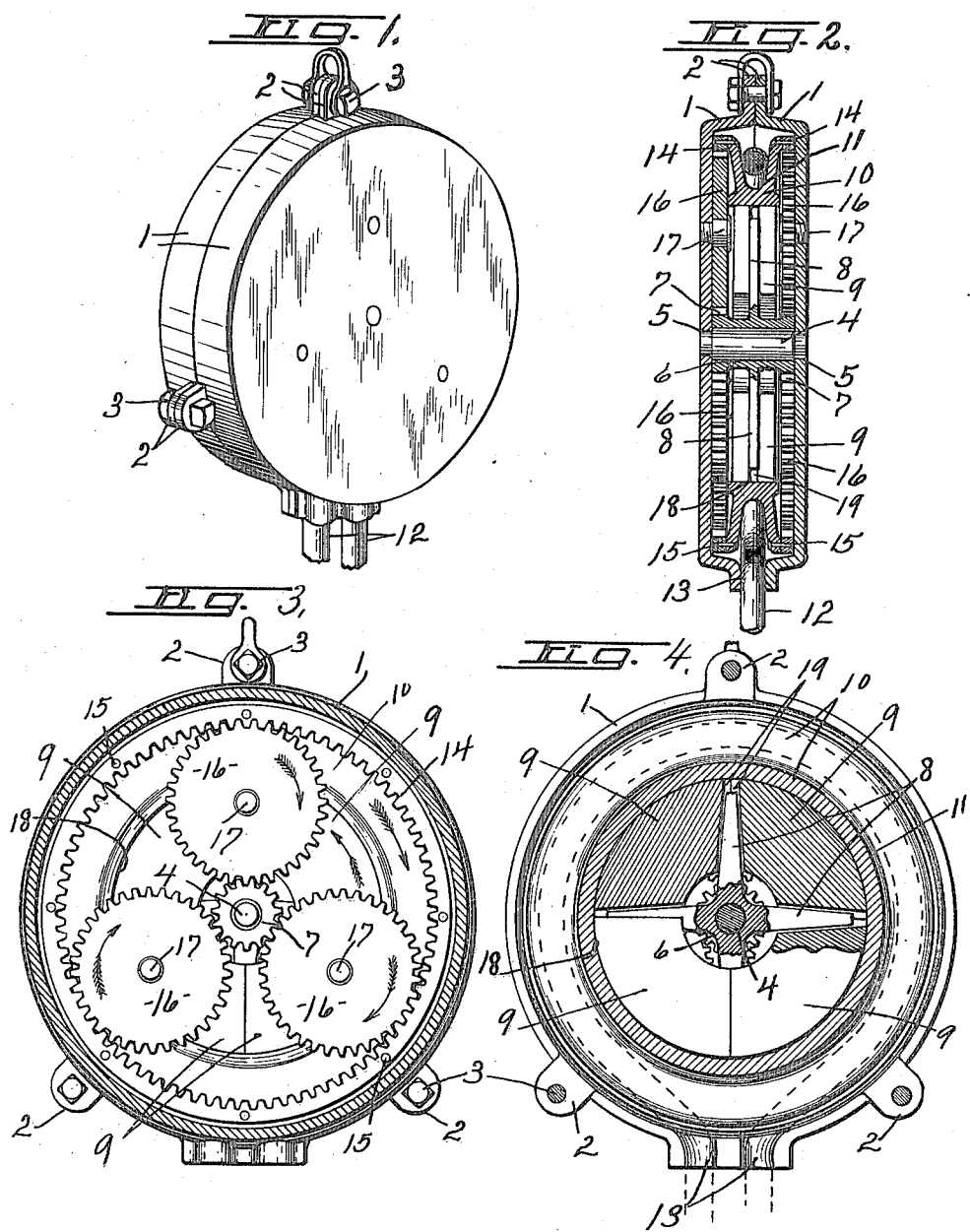

UNITED STATES PATENT OFFICE.

WALTER H. TIBBALS, OF SYRACUSE, NEW YORK.

FIRE-ESCAPE.

1,190,483.  Specification of Letters Patent.  Patented July 11, 1916.

Application filed November 14, 1913. Serial No. 800,952.

*To all whom it may concern:*

Be it known that I, WALTER H. TIBBALS, of Syracuse, in the county of Onondaga, in the State of New York, have invented new and useful Improvements in Fire-Escapes, of which the following, taken in connection with the accompanying drawings, is a full, clear, and exact description.

This invention relates to certain improvements in fire escapes of the class set forth in my pending application No. 792,901 filed October 1, 1913, and involving the use of a cable-operated reel or sheave and a centrifugally operated brake actuated thereby for regulating the speed of rotation of the reel or sheave and thereby regulating the descent of a person or other weight supported by the cable.

The main object is to bring the entire brake-operating mechanism wholly within the periphery of the cable-operated sheave or reel and, at the same time, to balance the rotating parts so as to avoid excessive binding or torsional strains which might interfere with the free operation of the moving parts.

Another object is to enable the parts to be easily and quickly assembled in symmetrically compact form and in such manner that each part aids in retaining the other parts in operative position.

A further object is to support the sheave wholly upon gear idlers forming parts of the mechanism for transmitting rotary motion to the brake shoes, thereby assuring a positive mesh with at least one of the intermediate gears and rendering the device more reliable by reason of the multiplicity of such intermediate gears which not only evenly distributes the load upon the center pinion and thereby reduces the liability of stripping the teeth, but also assures a positive drive of such pinion even though the teeth of one or more of the intermediate gears should be broken.

Other objects and uses will be brought out in the following description.

In the drawings, Figure 1 is a perspective view of a fire escape embodying the various features of my invention. Fig. 2 is an enlarged transverse sectional view through the center of the device shown in Fig. 1. Fig. 3 is a face view of the interior mechanism of the fire escape, showing the casing in section. Fig. 4 is a sectional view through the same device in the plane of the meeting faces of the case sections and centrally through the sheave or reel, showing portions of the brake shoes in section. Fig. 5 is a perspective view of the actuator for the brake shoes. Fig. 6 is a perspective view of one of the brake shoes. Fig. 7 is a sectional view similar to Fig. 2, showing a modified form of my invention in which the gears for transmitting motion from the reel to the brake shoe actuator is at one side only of the reel and brake shoes.

The fire escape, shown in Figs. 1, 2 and 3, comprises opposite similar case sections —1— of substantially the same circular form and size, preferably cup-shaped having their open sides provided with radial lugs or ears —2— for receiving clamping bolts —3— by which the case sections are secured together face to face to form a circular casing for receiving and inclosing the various moving parts presently described. The central portions of these case sections are braced or stayed against inward buckling by a central shaft or stay-bolt —4— having reduced ends which fit snugly in suitable apertures —5— centrally in the sections, the intermediate portion being enlarged to form shoulders engaging the inner faces of the case sections to hold them a fixed distance apart. This shaft or stay-bolt —4— also forms a convenient bearing for a rotary sleeve —6— which is fitted with an easy turning fit upon said shaft and is provided at its ends with pinions —7— preferably integral therewith, the central portion of the sleeve being provided with radially projecting arms —8— spaced uniform distances apart and together with the sleeve and pinions constitute what may be termed an actuator for a corresponding number of brake shoes —9—. These brake shoes preferably consist of quarter segments of cast brass, iron or other suitable metal of sufficient weight to operate by centrifugal force against the inner face of the reel or sheave —10— as they are rotated by the arms —8— of the actuator.

The sheave —10— is rotatably mounted within the casing so as to entirely surround the brake shoes and is provided in its periphery with an annular groove —11— gradually tapering inwardly and radially for receiving and supporting a cable —12— and frictionally holding the latter against slipping by wedging into the groove as the reel is rotated by a person or other weight supported by one or the other side of the cable.

It is found that by employing a cable of slightly greater diameter than the transverse width of the base of the sheave, a reel or sheave with a single groove may be employed in connection with a single turn of the cable in the groove providing the portions of the cable at one side of the sheave are brought into more or less close proximity and held in such position by adjacent guide openings —13— in the corresponding side of the case, thus permitting one side of the cable to be elevated to receive an occupant of the upper story of a burning building while the other side is being used to lower another person or load.

In the preferred form of my invention, the opposite sides of the sheave or reel —10— are provided with internal gears or circular toothed rings —14—, which for convenience of molding, are made separate and afterward secured to the opposite side faces of the sheave by pins —15— or equivalent fastening means although it is evident that these gears may be cast integral with the sheave if desired.

Rotary motion is transmitted from the internal gears —14— to the pinions —7— by means of intermediate idlers —16— which are located between opposite sides of the sheave and corresponding sides of the case and are journaled upon suitable studs —17— upon the adjacent sides of the case.

The inner surface of the sheave is circular and forms an annular braking surface —18— surrounding the peripheries of the brake shoes and adapted to be engaged by the latter when operated radially and outwardly by centrifugal force due to their rotation about the axis of the shaft —4— by the arms —8— of the actuator as the sheave —10— is rotated by the operation of one or the other side of the cable —12—.

If necessary or desirable, the pinion —7—, intermediate gear —16— and internal gear —14— at one side of the sheave may be omitted as shown in Fig. 7 in which case the corresponding side of the sheave would preferably be journaled upon the adjacent end of the sleeve —6— but the only object of that construction is to reduce the number of parts without in any way departing from the spirit of my invention.

The edges of the arms —8— of the actuator are preferably tapered radially and enter radial grooves —19— in the meeting edges of the brake shoes or segments —9— to hold the latter against undue lateral movement so as to avoid friction with the inner faces of the opposite gears —16—, it being understood that the actuator is held against axial movement by engagement of the ends of the sleeve —6— with the inner faces of the opposite case sections —1— as shown more clearly in Fig. 2.

It will be observed that the internal gears —14— are of nearly the same diameter as the sheave or reel —10—, the object of which is to permit the use of relatively large intermediate gears —16— and with comparatively small pinions —7— for the purpose of rotating the actuator at a much higher speed than that of the sheave and thereby assure an almost instantaneous action of the brake shoes against the inner face of the sheave as the latter is actuated by one or the other side of the cable. These internal gears —14— although secured to the sheave, and therefore constitute a part of it, also forms a part of the mechanism for transmitting reverse motion from the sheave to the actuator and thence to the brake shoes for operating the latter by centrifugal force against the inner face of the sheave, said mechanism being, therefore, located wholly within the periphery of the sheave so as to produce a compact structure capable of being placed within a circular case of only slightly larger diameter than the sheave.

The intermediate gears are spaced uniform distances apart around the axes of their respective pinions, thereby evenly distributing the load upon the corresponding internal gear and pinion and producing a balanced structure having its center of gravity approximately coincident with the center of the case. Another feature of this arrangement of the intermediate gears is that they constitute roller bearings for supporting the sheave concentrically with the axes of the pinions —6— and shaft —4— and assures a positive mesh between the internal gears on the sheave and intermediate gears and pinions by reason of the fact that the weight of a person or other object on one or the other side of the cable is carried by the sheave and transmitted to the intermediate gears and thence to the pinions but is distributed evenly to different portions of the internal gears and pinions so that the strain upon said gears in any one direction is reduced to a minimum.

By using separate sets of gears at opposite sides of the sheave, the actuator is rotated with greater precision in the same plane which tends to throw the weighted brake shoes —9— in direct radial lines against the inner face of the sheave as the latter is rotated by the cable.

In operation, the case may be secured in any desired manner to a suitable support within or upon the outside of the upper stories of the building in close proximity to a window or other exit, the cable being normally in position with one end free ready for use close to the case while the other end may be neatly reeled and supported in any convenient position, preferably close to the case, and free to uncoil when the first named end is being used to lower a person or other weight.

The length of the cable usually corresponds approximately to the distance of the fire escape from the ground or other safe landing so that when one end has been used to carry one or more persons to such landing, the other end will be in a position ready for use by another person or persons, thus permitting both sides of the cable to be used alternately.

During the descent of either side of the cable by weight thereon, the sheave will be rotated in one direction while the brake shoes —9— will be rotated bodily in the reverse direction and will be operated centrifugally against the inner face of the sheave, thereby retarding the speed of rotation of the sheave and regulating the descent of the person supported by the cable to a safe speed.

What I claim is:

In a fire escape, a case, a sheave therein having a single external annular groove and an internal annular brake-surface in the same plane of rotation as the groove, a single cable engaged in the groove and having its opposite ends passed out through one and the same side of the case in the same plane as the groove, centrifugally operated brake-shoes for engaging the brake-surface, a rotary actuator for the brake-shoes centrally within the sheave, and separate devices for transmitting motion from the opposite ends of the sheave to corresponding ends of the actuator.

In witness whereof I have hereunto set my hand this 10th day of November, 1913.

WALTER H. TIBBALS.

Witnesses:
H. E. CHASE,
EVA E. GREENLEAF.

Copies of this patent may be obtained for five cents each, by addressing the "Commissioner of Patents, Washington, D. C."